Patented Oct. 18, 1938

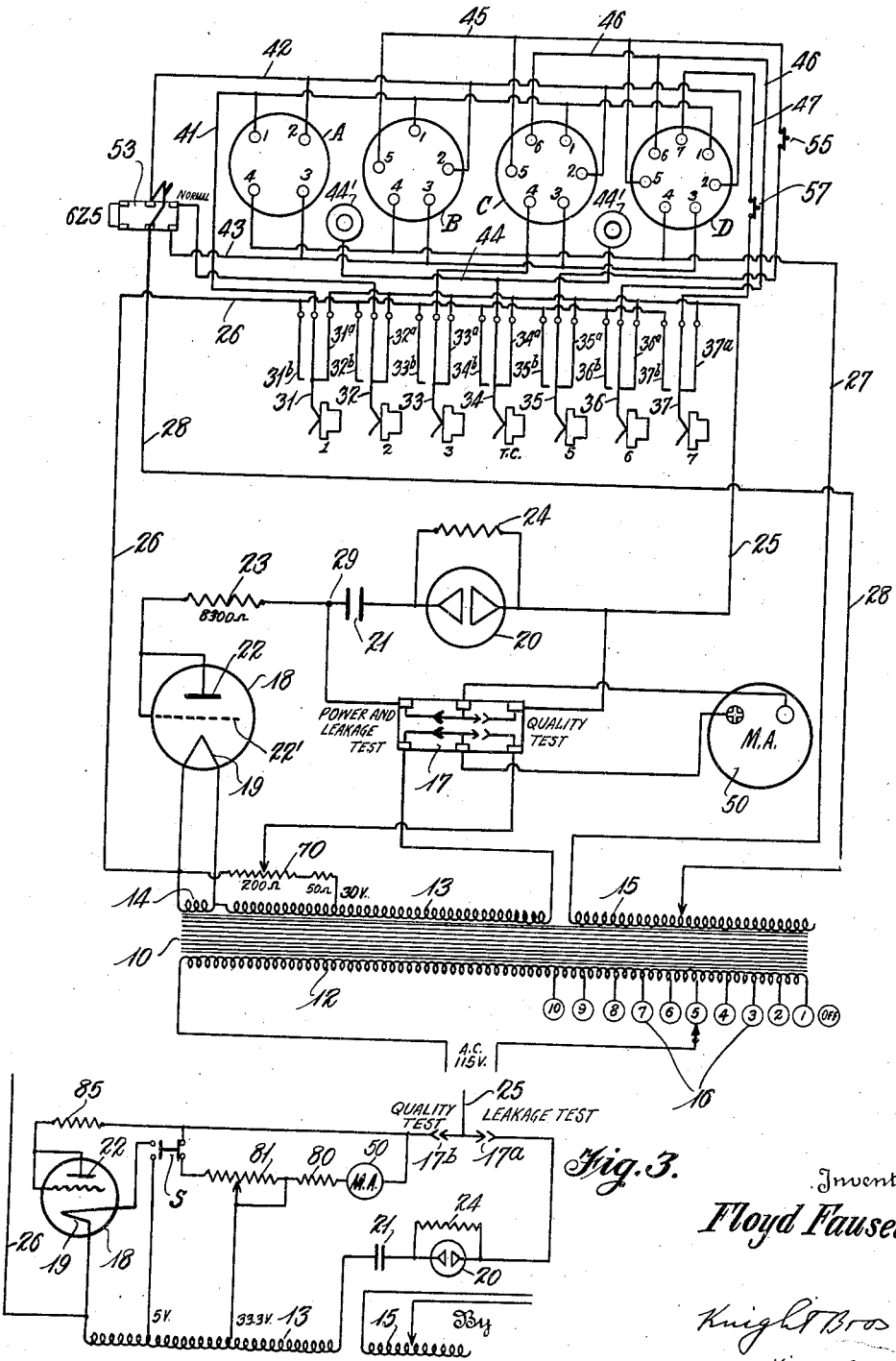

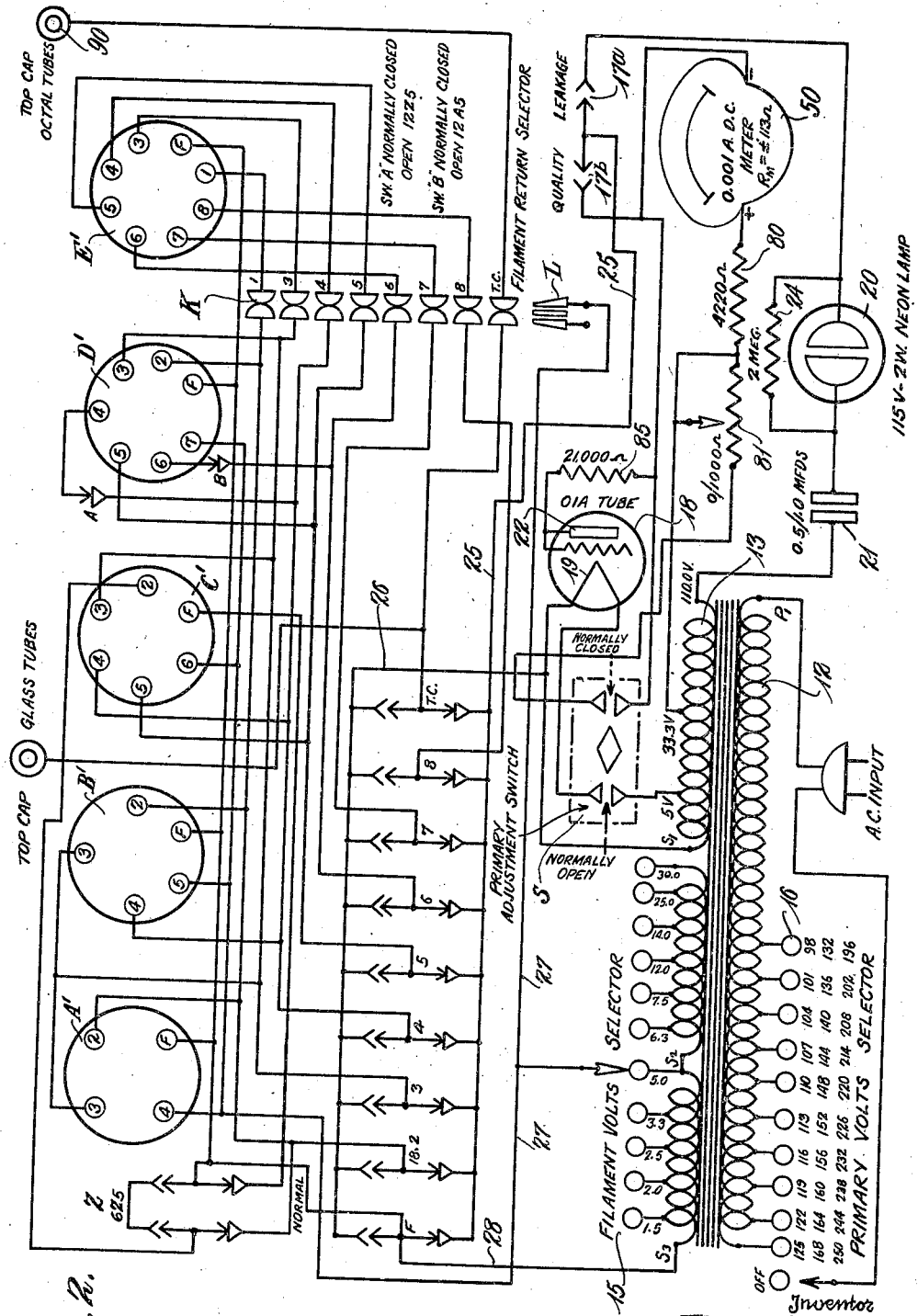

2,133,610

UNITED STATES PATENT OFFICE 2,133,610

TUBE TESTING APPARATUS

Floyd Fausett, Greenwood, Miss., assignor to Supreme Instruments Corporation, Greenwood, Miss.

Application January 23, 1936, Serial No. 60,511

13 Claims. (Cl. 250—27)

This invention relates to a radio tube testing apparatus.

One object of the invention is to provide a tube testing apparatus incorporating a test for determining short-circuit and leakage conditions between the elements of an audion tube as well as leakage between the heater and cathode elements of indirectly heated tubes.

It is a further object of the invention to provide a tester which will detect leaky insulation between the heater and cathode of a heater tube, when the leakage is so slight as to escape detection by meter testers of the type shown in my Patent No. 1,916,102.

It is an object of the invention to associate a single gaseous glow device such as a neon lamp with a switching arrangement whereby an easy manipulation of switches controls a visual indication of the glow lamp to designate the elements of the tube between which exists a short-circuit or leaky condition.

It is a further object of the invention to provide a tube-testing apparatus embodying a single socket for the reception of octal tubes and having a switching arrangement associated therewith to make possible the testing of octal tubes of both metal and glass of different design, particularly with respect to the terminal pins of the filament or heater circuits. Such an arrangement not only renders unnecessary the provision of as many sockets as there are different types of tubes in use at present, but renders the tester adaptable to future designs and precludes the possibility of obsolescence of the instrument.

Other objects and purposes will appear from a more detailed description of the invention following hereinafter taken in conjunction with the accompanying drawings, wherein Fig. 1 shows a circuit diagram illustrating my invention, Fig. 2 shows a modified form of the invention, including a socket for the testing of octal tubes, and Fig. 3 is a simplified diagram of a portion of Fig. 2.

In Fig. 1, a commercial source of alternating current energy is connected to the primary winding 12 of transformer 10 for the purpose of energizing the tester circuit. A series of taps 16 on the primary winding 12 permits an adjustment of the instrument in small increments corresponding to different voltage supplies to which the instrument may be connected in practice. The increments of voltage, to which the primary volts selector may be set, are indicated in Fig. 2. One end of the secondary winding 13 is connected to the anode 22 of a thermionic rectifier 18 through the intermediary of a switch 17. This switch has two positions, one for a "quality test" and another for a "power and leakage test". Since the instant invention is mainly concerned with the "power and leakage test", the switch 17 is shown in that position in the drawings, where it connects one end of the secondary winding 13 to the anode 22 through the meter 50 and resistor 23. The meter 50 serves only for effecting continuity of the circuit, finding its principal utility in the course of the performance of the quality tests. Also, the switch 17, in the position shown in Fig. 1 permits an adjustment of the primary winding 12 to be indicated upon the meter 50, that tap being selected which gives a reading at the mid-point of the meter, which is of the English reading type, having sectors "Bad", "Good", and "?" at the middle. The resistor 23 has a value of 8300 ohms. The thermionic rectifier 18 may consist of an ordinary type 01-A vacuum tube having the grid thereof 22' connected with the plate. The filament of this rectifier is energized from an auxiliary secondary winding 14 of the transformer 10.

A plurality of tube sockets A, B, C, and D are mounted on the apparatus for receiving tubes having a varying number of elements and are provided with terminals for making electrical connection with the elements of the tubes inserted therein. These terminals have been designated in the drawings as 1, 2, 3, 4, 5, 6 and 7. It is understood of course that this numbering is merely arbitrary and may be varied in accordance with standard practice in any manner desired. It is also clear that the number of sockets may be diminished or increased in accordance with requirements, and that the terminals in the sockets may be increased in conformity with the development of new radio tubes. According to the chosen numbering arrangement in Fig. 1, terminal 1 designates the grid; 2, the plate; 3 and 4, the heater terminals; 5, the cathode; and 6 and 7, auxiliary grids. Terminals 44' designated "top cap" are designed for connection to tubes having an element thereof protruding from the top.

An anode bus 25 extends from the connections to the anode 22 to a series of switches 1, 2, 3, T. C., 5, 6 and 7 associated with the tube sockets A, B, C and D. Each of the switches is provided with a movable leaf or arm, which in the case of switch 1 is designated as 31, and two fixed contact terminals 31a and 31b. The remaining switches 2, 3 T. C., 5, 6 and 7 are designated similarly by the numerals and reference letters 32, 33, 34, 35, 36 and 37, respectively.

Each of the terminals 1 of the sockets A, B, C and D is connected to conductor 41 and switch arm 31. Each of the terminals 2 of these sockets is connected to a conductor 42 and through switch 53 in its "normal" position to switch arm 32. Each of the terminals 3 of the sockets is connected to a conductor leading to switch 53 in its "normal" position and thence over conductor 28 to an adjustable arm making contact with taps on an auxiliary secondary winding 15 on transformer 10 adjusting the voltage applied to the filament or heater terminals. Each of the terminals 4 of the sockets is connected to a bus 27 connected with the fixed end of the secondary winding 15. The switch arm 33 makes permanent connection with the bus 27. The "top cap" terminals 44' are connected through conductor 44 with the switch arm 34 of switch T. C.

Each of the terminals 5 of the tube sockets B, C, and D is connected through conductor 45 with switch arm 35 of switch 5. A normally closed switch 55 is provided in conductor 45 which is opened for testing type 12A5 tubes.

Each of the terminals 6 of sockets C and D is connected through conductor 46 to switch arm 36 of switch 6.

The terminal 7 of tube socket D is connected through conductor 47 to switch arm 37 of switch 7. A normally closed switch 57 is interposed in conductor 47 and is opened for the purpose of testing tubes of the 12Z5 type.

In the course of testing type 6Z5 tubes the switch 53 is thrown from its "normal" position on the right to its position on the left, designated 6Z5.

A gaseous glow device consisting of a double plate neon lamp 20 is inserted in the anode bus 25, bridged by a resistor 24 of 0.1 megohm. The sensitivity of the neon lamp may be controlled by the magnitude of this shunting resistor. Likewise, the sensitivity may be controlled by using a capacitive impedance in shunt to the neon lamp, such as a condenser having a capacity of 0.01 to 0.1 mfd. Whereas a shunting resistor of 0.1 megohm will cause a flashing as explained below when leakages up to 100,000 are encountered, in order to increase the sensitivity of the glow device so that it may flash when leakages up to 2 megohms are encountered, resistor 24 is given a value of 2 megohms. The shunting of the neon lamp by an impedance of suitable magnitude permits a control of the sensitivity of the instrument in conformity with acceptable engineering design, that is, minute leakages which do not impair the proper functioning of the radio tube, will not be indicated. This lamp is designed with a standard screw base having a rating of 110 volts and 2 watts. This lamp is primarily a voltage operating device, requiring negligible current for its operation. Also, it operates with no time lag or inertia which is the case with other indicating devices such as pilot lights and meters. A condenser 21, which may be of 0.5–1.0 microfarad is in series with the neon lamp 20 between the latter and the junction point 29 of the connections from the anode 22 and the secondary winding 13. This condenser serves the useful purpose explained hereinafter.

A bus 26 extends from the cathode 19 to the series of switches 1, 2, 3, T. C., 5, 6 and 7, being connected with the contact terminals 31b, 32b, 33b, 34b, 35b, 36b and 37b, respectively. The selective actuation of any of these switches serves to shift to the bus 26 the connections normally made from the terminals of the tube sockets to the anode bus 25 through the movable switch arms 31—37 and the stationary contacts 31a—37a. This switching effects an indication of the neon glow lamp which determines any faulty conditions existing between the elements of the tube under test.

To take a specific example, assume a type 27 tube under test, which is placed in socket B. The thermionic rectifier is in effect connected across the ends of the secondary winding 13, and the anode bus 25 and the second bus 26 extend in parallel therefrom, being also connected across the ends of the secondary winding. With all of the switches in their normal position, all of the elements of the tube are connected to the anode bus. The selective depression of the switches connects the corresponding terminal of the tube socket and consequently the corresponding element of the tube to the bus 26, thereby completing a circuit through the neon lamp which indicates the condition of the tube under test. Thus when switch 1 is depressed, a circuit is made from the junction point 29 through condenser 21, neon lamp 20, anode bus 25, switch arm 35a, switch arm 35, conductor 45, socket terminal 5, the cathode of the tube under test, across to the grid element of the tube under test, terminal 1 of the socket, conductor 41, switch arm 31, stationary contact 31b (in view of the depressed condition of switch 1), bus 26, and to the junction point of thermionic rectifier 18 with the secondary winding opposite the end to which junction point 29 is connected. With no short circuit existing between the cathode and the grid elements of the tube under test, a momentary flicker or flash of one of the terminals of the neon lamp 20 takes place. This momentary flash is caused by the rectifying action of the resulting alternating current energy between the cathode and grid elements and by the consequent charging and discharging of the condenser 21. The wave form of the varying current passing through the neon lamp may be composed of the alternating current supplied by the secondary winding 13 and the pulsating current produced by the rectifier 18, producing a modified alternating current wave form. When the number 5 switch is depressed to complete the same circuit as outlined above in a reverse direction through the tube under test a flickering of the other terminal of the neon lamp takes place. A short circuit between the grid and cathode of the tube under test will cause a flashing of both neon elements at the same time for the reason that the rectifying action between the elements under consideration is eliminated and the neon lamp is operative in a closed loop in series with a condenser.

The momentary flicker or flash mentioned above serves the useful purpose of indicating the proper internal connections to the tube elements. The absence of a "surge flash" upon the depression of a switch appurtenant to any element following immediately upon the depression and release of the cathode switch indicates an open circuit for that element.

If the depression of switch 1 revealed no fault, switch 2 is depressed and the same operation takes place with respect to the plate of the tube under test as did with the grid element. The same element of the neon tube glows as in the case of the depression of switch 1.

A short circuit condition in which the heater element takes part is determined by the depression of switch 3. Of course, should such a condition exist, the loop in which the neon lamp finds itself is closed and the glowing of both elements indicates this condition. On the other hand, although no short circuit exists, the insulation between the heater element and the cathode may be faulty which nevertheless may not be easily discernible by testing with a meter experiencing only a minute deflection. In order to exclude the influence of the direct current electronic emission from the cathode element towards the heater element, the condenser 21 is provided in the circuit. Thereby the same test is applied between the cathode and the heater element as is applied between the cathode and the other elements of the tube. Only the alternating current rectification is effective to produce an indication of the neon lamp. If the resistance of the insulation is sufficiently high, the current in the loop is inadequate to effect a flashing of both of the elements of the neon lamp. On the other hand, if the resistance is below a desired minimum value, such as 100,000 ohms, the neon lamp flashes despite the exclusion of the effects of the electronic emission from the cathode. Without the condenser 21 in the circuit, a flashing of both elements of the neon lamp would be possible despite a sufficiently high resistance between the cathode and heater on account of the direct current flow from the former to the latter.

As explained above, the leakage and the short circuited conditions existing between any of the elements of the tube under test are indicated by the operation of any one of the switches to which these elements are connected. Thereby the elements involved in a short circuited condition may be determined by the noting of the switches which effect a flashing of both elements of the neon lamp. For example, a leakage or short-circuited condition involving the control grid and screen grid of a type 35 tube, placed in socket B, would be revealed by a glow of both electrodes of the neon lamp when the "T. C." button is depressed, and again when the number "1" button is depressed.

In the course of testing tubes which have more than one cathode element, such as the types 12A7, 12Z5, and 25Z5 tubes, all of the cathode switches should be simultaneously depressed for all "leakage" and "quality" tests involving these elements. For example, when conducting the "leakage" test for the type 12A7 tube, the buttons marked 1, 2, 3, and T. C. should be depressed successively; that is, one at a time. But instead of depressing the #5 button alone, the #5 and #7 buttons should be depressed together; otherwise the neon lamp may glow when either the #5 or the #7 button is depressed alone. After depressing the #5 and #7 buttons together, and releasing them, the #6 button may be depressed for completing the "leakage" test. A similar procedure should be followed for other multi-cathode tubes, except that the markings may be different for the cathode buttons involved.

The "quality" test of the tubes is performed after the "leakage" test indicates no faults. This test consists of a simple electron emission test in which the tube under test is inserted in a socket, its cathode is energized in accordance with its standard rating, and its remaining elements are impressed with a potential of about 30 volts. A critical adjustment of the potentiometer 70, which is predetermined for any given type of tube, gives rise to a deflection of the meter 50 into the "Good" or "Bad" range thereof, depending upon the condition of the tube, when a circuit through the tube is completed by the depression of one of the switches 1—7. The potential of the secondary output is accurately adjusted before the initiation of the tests by selecting the primary tap which gives most nearly a median deflection upon the meter.

Figs. 2 and 3 illustrate another embodiment of the invention, incorporating several refinements and improvements over the tester shown in Fig. 1.

In this embodiment of the invention there are provided four sockets A', B', C', and D' for the reception of different types of tubes embodying from four to seven pins in the base and a top cap. These are connected in a manner similar to that described in connection with the embodiment shown in Fig. 1. In addition, there is provided an additional socket E' for the reception of octal tubes of glass or metal with or without a top cap. The terminals of the several pin sockets are shown numbered according to the most recent standardization practice wherein the terminals are consecutively numbered in a rotational direction and the heater or filament circuits are connected between the F terminals and the terminals 4, 5, 6, or 7.

In the case of the octal tubes, the practice has been established to use the No. 1 pin to terminate the metal shield and the No. 2 pin as one of the filament or heater pins, it being possible for the other filament terminal to be the top cap or any pin from No. 3 to No. 8. This means, that, if a single 8-hole socket is to be used in which to test all elements of all octal tubes, it is necessary to select the contact of the octal tube to which the one side of the filament potentials may be applied, in addition to selecting the filament or heater potential to be applied; otherwise, a separate 8-hole socket or adapter would have to be added for each new pin combination.

The filament or heater circuits terminate at what are known as the pins numbered 2 and 7 on the octal tubes which were included in the preliminary announcements of metal tubes. Subsequently, the metal tube type 5Z4 was announced with a filament circuit terminated by pins numbered 2 and 8, and a later type 6P7 was announced with a heater circuit terminated by pins numbered 2 and 3, so that a tester socket in which the filament or heater potentials are applied to the contacts numbered 2 and 7, only, cannot be used for testing the later types in which the filament is terminated by pins numbered 2 and 3 or 2 and 8.

Thus, without the instant invention, three 8-hole sockets are necessary to enable a test of all of the elements of the first few octal tubes already in use; it would be possible for a user to insert an 8-pin tube in the wrong socket, and the tester would be partially obsolete in the event a metal tube were announced in which neither pin 3, 7, or 8 were used as one of the filament or heater pins. By providing the switching device K—L composed of a series of normally closed contacts which may be opened selectively by the switch member L, it is possible to select the filament or heater return element, considering that the filament or heater current as entering the No. 2 pin of the octal tubes, so that the return of the current can be effected through the "top cap" terminal 90 or through any one of the numbered pins of such tubes. By the use of this switch no adapters are required, and only one 8-hole socket is needed for all present or future octal tube types.

Fig. 3 shows the circuit connections of a part of Fig. 2 in a simplified form and presents an improvement over the circuit illustrated in Fig. 1. Whereas, in the embodiment shown in Fig. 1 when the switch 17 is thrown for the "power and leakage test", the meter 50 remains in the circuit permanently throughout the leakage tests, in the arrangement of Figs. 2 and 3 the meter is switched into the circuit only when the taps of the primary winding are adjusted for making the power test and is inoperative during the leakage tests. The switch S, when thrown to its left position, energizes the filament 19 of the rectifier tube 18 from a 5 volt tap of the secondary winding 13, thereby placing the rectifier tube in series with the meter for the purpose of making the power supply adjustments. Thereupon the leakage tests are executed without either the rectifier tube and the meter in the circuit, and thereafter by suitable manipulation of switch 17a—17b, the quality tests are performed.

The resistances 80 and 81, associated with the meter 50, are selected and arranged in order to render the quality test accurately indicative of the actual condition of the tube under test while affording maximum protection to the meter under all conditions which may be encountered. The maximum degree of accuracy is obtainable when the external load resistance is considerably less than the effective internal tube resistance value of every tube, and when the ratio between internal tube resistance values and external circuit resistance values are constant for all types of tubes.

As indicated in these diagrams, the quality test is effected by a potential of 33.3 volts imposed between the elements of the tube connected to the anode bus and the filament or cathode. The meter selected is a direct current meter having a full scale deflection of 1.0 milliampere and an internal resistance of 113 ohms. Since the tester is calibrated for normal tube readings at the center of the "good" sector of the meter scale which is 77% of the full scale deflection, the current load is 77% of 1.0 milliampere, or 770 microamperes (0.00077 ampere). An external resistance 80 of 4220 ohms is placed in series with the meter making the total meter circuit resistance value equivalent to 4333 ohms. The potential drop across the metering circuit which is equivalent to the product of the load and the total meter circuit resistance value is equivalent to 3.3 volts, regardless of the setting required for the potentiometer 81, having a value of 1000 ohms, to produce a 77% meter scale reading. In other words, when the potentiometer setting is adjusted to accommodate the load conditions of any normal tube, with the meter pointer deflected 77% of its range, the potential drop across the meter is 3.3 volts, leaving 30 volts of the total potential value of 33.3 volts to be applied across the tube. Therefore, the ratio of the tube voltage to the meter voltage, or of the internal tube resistance to the external circuit resistance is constantly $$\frac{30}{3.3}$$

or 9 to 1 for any tube, regardless of the load.

In the event of a short circuit in the tube under test, there can be no potential drop across such a short circuit and the whole potential of 33.3 volts is developed across the metering circuit. With the resistance value of 4333 ohms and a full scale load value of 1 milliampere, the full scale potential of the meter is 4.3 volts. Since the meter can safely withstand 10 times its normal load an indefinite number of times, its overload potential limit is 43.3 volts, so that an applied potential of 33.3 volts caused by a short circuited tube, is 10 volts under the safe overload limit of the meter.

Assuming a tube under test which is not short circuited and which has a normal internal resistance of 100 ohms, but which has depreciated to the extent that its internal resistance is doubled, the metering circuit shown in Figs. 2 and 3 indicates correctly such condition. Since, as stated above, when the tester is calibrated for normal tubes, the ratio between the tube and circuit resistance is 9:1, the joint resistance of the meter and potentiometer can be determined by the following proportional relationships:

$$\frac{9}{1} = \frac{100}{x}$$

$$9x = 100$$

$$x = 11.1 \text{ ohms}$$

Therefore, the total circuit resistance, when the tube is normal, is 111.1 ohms; and when the tube has depreciated so that its effective internal resistance is doubled, the total circuit resistance is 211.1 ohms. After depreciation the meter reading will be $$\frac{111.1}{211.1}$$

or 52.6% of the normal reading of 77 or 40.5, which falls in the "bad" sector of the meter scale. With this arrangement of balanced ratio between internal tube and external tube resistance values, the meter reading drops in proportion to tube depreciation and thereby correct indications of the quality of the tube are obtained.

While I have described my invention as embodied in concrete form and as operating in a specific manner for purposes of illustration, it should be understood that I do not limit my invention thereto, since various modifications will suggest themselves to those skilled in the art without departing from the point of my invention, the scope of which is set forth in the annexed claims.

Having described my invention, I claim:

1. In a tube testing device, an electrical supply system comprising two bus wires, a tube socket for receiving a tube to be tested, a plurality of terminals associated with said socket adapted to make electrical connection with the elements of the tube, switching means connected with a plurality of said terminals adapted to connect them normally to one of said bus wires and selectively to disconnect individual terminals from said first bus wire and to connect the same to the second bus wire by the operation of said switching means, and a gaseous glow device in one of said bus wires adapted to detect short-circuit and leakage conditions between the elements of the tube when one of the elements contributing to this condition is connected to the second bus wire.

2. In a tube testing device, a source of alternating current energy comprising a transformer having a primary winding and a secondary winding, two bus wires connected respectively to different points on said secondary winding, a tube socket for receiving a tube to be tested, a plurality of terminals associated with said socket adapted to make electrical connection with the elements of the tube, switching means connected with a plurality of said terminals adapted to connect them normally to one of said bus wires and selectively to disconnect individual terminals from said first bus wire and to connect the same to the second bus wire by the operation of said switching means, and a gaseous glow device in one of said bus wires adapted to detect short-circuit and leakage conditions between the elements of the tube when one of the elements contributing to this condition is connected to the second bus wire.

3. In a tube testing device, a source of alternating current energy comprising a transformer having primary and secondary windings, a rectifier comprising an anode and an electron-emitting element connected across the secondary winding, an anode bus extending from said anode, a second bus extending from said electron-emitting element, a tube socket for receiving a tube to be tested, a plurality of terminals associated with said socket adapted to make electrical connection with the elements of the tube, switching means connected with a plurality of said terminals adapted to connect them normally to said anode bus and selectively to disconnect individual terminals from said anode bus and to connect the same to the second bus by the operation of said switching means, and a gaseous glow device in said anode bus adapted to detect short-circuit and leakage conditions between the elements of the tubes when one of the elements contributing to this condition is connected to the second bus.

4. In a tube testing device, an electrical supply system comprising two bus wires, a tube socket for receiving a tube to be tested having a plurality of elements including cathode and heater elements, a plurality of terminals associated with said socket adapted to make electrical connection with the elements of the tube, switching means connected with a plurality of said terminals adapted to connect them normally to one of said bus wires and selectively to disconnect individual terminals from said first bus wire and to connect the same to the second bus wire by the operation of said switching means, a gaseous glow device in one of said bus wires adapted to detect short-circuit and leakage conditions between the elements of the tube when one of the elements contributing to this condition is connected to the second bus wire, and a condenser in series with said gaseous glow device for excluding the effects of the rectifying action between the cathode and heater elements upon the operation of said gaseous glow device.

5. In a tube testing device, a source of alternating current energy comprising a transformer having primary and secondary windings, a rectifier comprising an anode and an electron-emitting element connected across the secondary winding, an anode bus extending from said anode, a second bus extending from said electron-emitting element, a tube socket for receiving a tube to be tested having a plurality of elements including cathode and heater elements, a plurality of terminals associated with said socket adapted to make electrical connection with the elements of the tube, switching means connected with a plurality of said terminals adapted to connect them normally to said anode bus and selectively to disconnect individual terminals from said anode bus and to connect the same to the second bus by the operation of said switching means, a gaseous glow device in said anode bus adapted to detect short-circuit and leakage conditions between the elements of the tubes when one of the elements contributing to this condition is connected to the second bus, and a condenser in said anode bus in series with said gaseous glow device for excluding the effects of the rectifying action between the cathode and heater elements upon the operation of said gaseous glow device.

6. In a tube testing device, a source of alternating current energy comprising a transformer having primary and secondary windings, a rectifier comprising an anode and an electron-emitting element connected across the secondary winding, an anode bus extending from said anode, a second bus extending from said electron-emitting element, a tube socket for receiving a tube to be tested having a plurality of elements including cathode and heater elements, a plurality of terminals associated with said socket adapted to make electrical connection with the elements of the tube, switching means connected with a plurality of said terminals adapted to connect them normally to said anode bus and selectively to disconnect individual terminals from said anode bus and to connect the same to the second bus by the operation of said switching means, a gaseous glow device in said anode bus adapted to detect short-circuit and leakage conditions between the elements of the tubes when one of the elements contributing to this condition is connected to the second bus, and a condenser in said anode bus in series with said gaseous glow device between said glow device and the junction of the secondary winding with the connection extending from said anode for excluding the effects of the rectifying action between the cathode and heater elements upon the operation of said gaseous glow device.

7. In a tube testing device, a source of alternating current energy comprising a transformer having a primary winding and a secondary winding, a bus connected to one part of said secondary winding, a second bus connected to another part of said secondary winding, a tube socket for receiving a tube to be tested having a plurality of elements including cathode and heater elements, a plurality of terminals associated with said socket adapted to make electrical connection with the elements of the tube, switching means connected with a plurality of said terminals adapted to connect them normally to said first bus and selectively to disconnect individual terminals from said first bus wire and to connect the same to the second bus by the operation of said switching means, and a gaseous glow device in series with a condenser in one of said buses to detect short-circuits between the elements of the tube and leakage conditions between the cathode and heater elements when one of the elements contributing to these conditions is connected to the second bus.

8. In a tube testing device, an electrical supply system comprising two bus wires, a tube socket for receiving a tube to be tested having a plurality of elements including cathode and heater elements, a plurality of terminals associated with said socket adapted to make electrical connection with the elements of the tube, switching means connected with a plurality of said terminals adapted to connect them normally to one of said bus wires and selectively to disconnect individual terminals from said first bus wire and to connect the same to the second bus wire by the operation of said switching means, and a gaseous glow device in series with a condenser in one of said buses to detect short-circuits between the elements of the tube and leakage conditions between the cathode and heater elements when one of the elements contributing to these conditions is connected to the second bus.

9. In a tube testing device, a source of alternating current energy comprising a transformer having a primary winding and a secondary winding, a bus connected to one part of said secondary winding, a second bus connected to another part of said secondary winding, a tube socket for receiving a tube to be tested having cathode and heater elements, a plurality of terminals associated with said socket adapted to make electrical connection with the elements of the tube, a source of electrical energy for energizing the heater element and thereby activating the cathode element, switching means for normally connecting said cathode and heater elements to one of said buses and for disconnecting selectively one of said elements from said first bus and connecting the same to the other bus, and a gaseous glow device in one of said buses for detecting short circuit and leakage conditions between the cathode and heater elements.

10. In a device for testing leakage between the cathode and heater elements of a thermionic tube, a circuit including a voltage producing means, said two elements, and a gaseous discharge lamp shunted by an impedance; said impedance having a value so related to the resistance of the leakage path between said elements as to raise the voltage drop across said gaseous discharge lamp from below the critical voltage at which said lamp discharges to above said critical voltage, when the resistance of said leakage path drops below a predetermined minimum.

11. In a device for testing tubes of various types having an electron emission energizing filament, a socket to receive the tube to be tested having one terminal adapted to contact one end of said filament, and a plurality of other terminals any one of which may contact the other end of said filament, depending upon the type of tube; a partial circuit including means for generating a current to be supplied to said filament and having two terminals, one of which is connected with said first socket terminal; and switching means for selectively connecting the other terminal of said partial circuit with the other terminals of said socket.

12. In a device for testing tubes of various types having an electron emission energizing filament, a socket to receive the tube to be tested having one terminal adapted to contact one end of said filament, and a plurality of other terminals variously contacting the other elements of the tube and the opposite end of said filament, depending upon the type of tube; a partial circuit including, in series, a current source, an indicating device, and a pair of buses; two sets of stationary switch members connected respectively with said two buses, and a set of movable switch members normally in contact with the respective members of one of said stationary sets and movable individually to break contact with the members of said first stationary set and to make contact with the members of the other stationary set; means connecting said movable switch members respectively with the terminals of said socket, each connection including a pair of separable, normally engaged contacts; a second partial circuit for supplying current to the filament of the tube, including a current source and two terminals, one terminal being connected to said first mentioned socket terminal, the other being movable and adapted to be interposed selectively between said separable contacts, to interrupt the connection and to connect the corresponding socket terminal in said second partial circuit.

13. Apparatus for testing the condition of a thermionic tube comprising a partial circuit including voltage generating means, a meter and resistance, and means for establishing a connection with the elements of a tube to be tested, the resistance of said partial circuit being determined with reference to said voltage generating means so as to limit the current through said meter, in case of a short circuit of the elements of the tube being tested, to not more than a predetermined multiple of the current causing a full scale deflection of said meter which is within the overload capacity of the meter.

FLOYD FAUSETT.